March 19, 1946.  J. A. MAURER, JR.  2,397,027
OPTICAL SYSTEM
Filed July 4, 1942  2 Sheets-Sheet 1

INVENTOR:
John A. Maurer, Jr.
BY *Otto J. Nathanson*

HIS AGENT.

March 19, 1946.  J. A. MAURER, JR  2,397,027
OPTICAL SYSTEM
Filed July 4, 1942  2 Sheets-Sheet 2
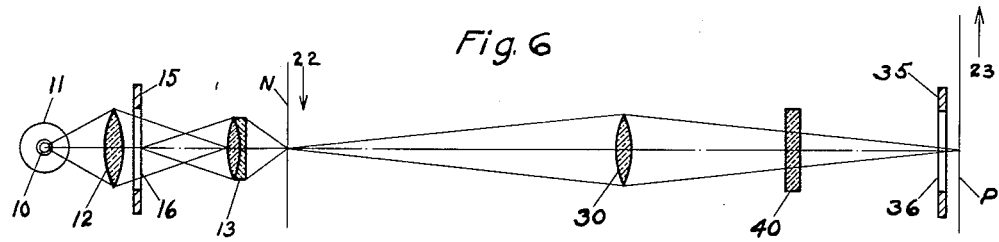
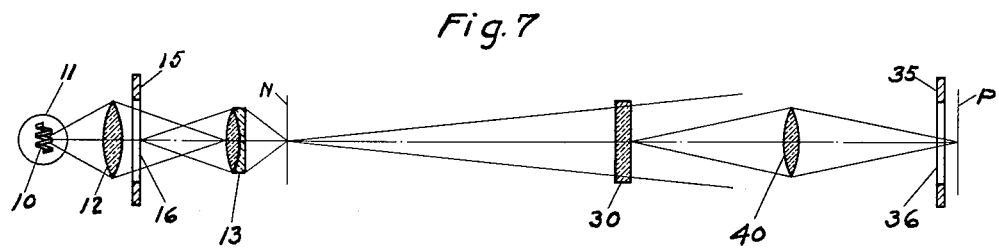
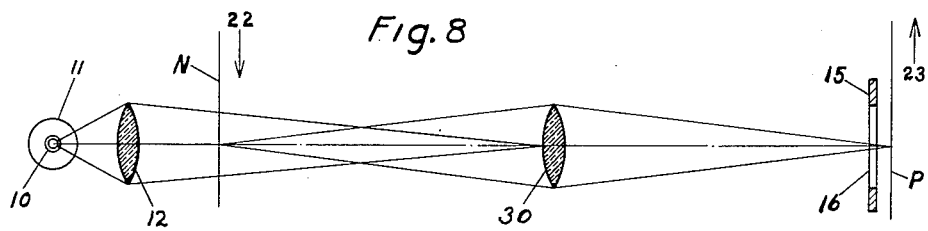
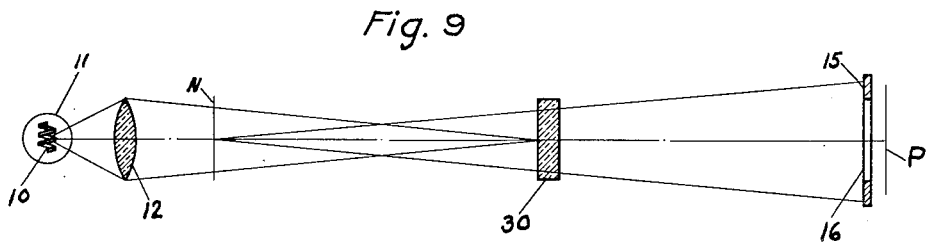
INVENTOR:
John A. Maurer, Jr.
BY Otto J. Nathansohn
HIS AGENT.

Patented Mar. 19, 1946

2,397,027

UNITED STATES PATENT OFFICE 2,397,027

OPTICAL SYSTEM

John A. Maurer, Jr., New York, N. Y., assignor to J. A. Maurer, Inc., New York, N. Y., a corporation of New York Application July 4, 1942, Serial No. 449,798

3 Claims. (Cl. 88—24)

This invention relates to optical systems for optical sound track printers and, more particularly, it relates to novel optical systems of this kind by which a variable density sound track may be printed from negative films having either a variable density or a variable area sound track thereon.

In the sound printing optical systems known heretofore, the imaging means, that is, the lens or the lens system, employed for forming on the positive film an image of the sound track on the negative film is made up either of a spherical lens, or of a combination of only spherical lenses, or of a combination of only cylindrical lenses, or of a combination of both spherical and cylindrical lenses. In optical systems in which either one of the last mentioned two types of imaging means is employed, the actions of the various cylindrical, or cylindrical and spherical, lenses in the two co-ordinate planes add up in such a manner that the negative and positive films are at conjugate foci of the optical system in both planes. The actions of the two imaging means in the two co-ordinate planes thus cooperate in any one of the three cases so as to form an image on the positive film which is a replica of the sound track on the negative film as regards both the amount and the distribution of its illumination. When, therefore, the sound track on the negative film is of the variable area type, the sound track produced on the positive film is also of the variable area type, and when the sound track on the negative film is of the variable density type, the sound track produced on the positive film is also of the variable density type.

In present day practice, the choice between the two types of sound track is generally made in such a manner that where variable area sound track is chosen for recording it is also chosen for reproduction, and where variable density sound track is chosen for recording it is also chosen for reproduction, and for this manner of choosing the type of sound track the known sound printing optical systems are suitable enough. It has been found, however, that, with the refined methods of sound-on-film recording and reproduction now available, it is at times desirable to record sound by a method that will result in a variable area sound track but to reproduce the sound so recorded from a variable density sound track. To that end, the variable area sound track on the negative film must be converted into a variable density sound track on the positive film. This conversion is preferably effected during the printing operation, and preferably by optical means since the employment of mechanical or electrical means would easily introduce objectionable distortions and thus defeat the main purpose of the conversion, namely, the production of a sound record from which sound may be reproduced with particularly high fidelity.

One object of the invention, therefore, is to provide sound printing optical systems by means of which a variable area sound track on the negative film may be converted into a veriable density sound track on the positive film, the variable density sound track having otherwise the same characteristics as the variable area sound track.

Another object of the invention is the provision of such optical systems in which the conversion is effected solely by optical means.

Another object of the invention is the provision of such optical systems by which the conversion is effected in a particularly simple and efficient manner.

Another object of the invention is to provide optical systems affording simple, convenient, and efficient means for printing very wide variable density sound tracks from sound tracks of standard or substandard width.

Another object of the invention is to provide optical systems for the printing of variable density sound tracks which do not require the provision of cylindrical or other anamorphosers for efficient operation with different ratios of magnification in the two co-ordinate directions.

Still other objects and advantages of the invention include those which are hereinafter stated or apparent, or which are incidental to the invention.

The objects of the invention are substantially achieved by providing sound printing optical systems in which the imaging means forming on the positive film an image of the sound track on the negative film acts in only the vertical plane and at the same time is the only imaging means having at its conjugate foci the sound track on the negative film and the positive film, respectively. The negative and positive films, therefore, are at conjugate foci of these optical systems in only the vertical plane, while they are out of focus with respect to each other in the horizontal plane.

In the foregoing brief explanation of the state of the art and summary of the invention, and throughout the present specification, the term "co-ordinate planes" designates two planes at right angles to each other whose line of intersection is the optical axis of the system. The terms "plane of the negative film" and "plane of the positive film," respectively, designate the two planes at right angles to the optical axis, and hence to the two co-ordinate planes, through which the negative film and the positive film, respectively, move at the points where they are intersected by the optical axis. The direction in which the negative and positive films move through their respective planes, and directions parallel thereto, are called "vertical," and the direction on the two films which is at right angles to the vertical direction at the points of intersection by the optical axis, and the directions parallel thereto, are called "horizontal." The vertical and horizontal directions together are sometimes referred to as the "co-ordinate directions." Of the two co-ordinate planes, the plane which contains the optical axis and the horizontal directions is called the "horizontal plane," while the plane which is at right angles to the horizontal plane is called the "vertical plane."

Thus, in the present specification the terms "vertical" and "horizontal" are not used in any absolute sense but merely to distinguish between two planes, or two directions, at right angles to each other, and choice between these two terms has been determined merely by convenience in description and illustration.

Likewise, the terms "negative film" and "positive film" are used throughout this specification not as referring to any particular type of film stock, but the term "negative film" merely designates the film carrying the sound track from which a print is to be made, and the term "positive film" the film on which the print is made.

Finally, the term "variable area sound track" is used throughout this specification as including the two kinds of variable area sound track known in the art as unilateral and bilateral, or symmetrical, variable area tracks. It also includes any noiseless unilateral and bilateral variable area tracks, be they produced by the bias or by the shutter noiseless method.

The invention will be better understood when the following description is considered with the accompanying drawings of several presently preferred embodiments thereof, and its scope will be pointed out in the appended claims.

In the drawings:

Figs. 6 and 7 are diagrammatic longitudinal sections in the vertical and horizontal planes, respectively, of another embodiment of the invention.

Figs. 8 and 9 are diagrammatic longitudinal sections in the vertical and horizontal planes, respectively, showing a modification as applied to the optical system of Figs. 1 and 2.

Figure 4:
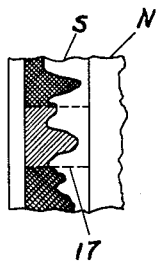
Fig. 4 is an enlarged elevation of the negative film showing the uniformly illuminated light spot which is formed in the plane thereof in the optical system of Figs. 1 and 2.

The embodiment of the conversion sound printing optical system according to the invention which is shown by way of example in Figs. 1 to 5, has the following arrangement for uniformly illuminating that area of the variable area sound track S on the negative film N (Fig. 4) which is to be printed at any given instant of the printing operation. An appropriate light source such as the filament 10 of an incandescent lamp 11 is imaged by a spherical condenser 12 substantially at the spherical lens 13, which is illustrated by way of example as a simple achromat. A screen 15 with a rectangular opening 16 (Fig. 3) is placed between lamp 11 and spherical lens 13, and an image of opening 16 is formed by spherical lens 13 in the plane of the negative film N. By the action of spherical condenser 12, which may be placed on either side of screen 15, opening 16 is uniformly illuminated and, since lens 13 is spherical and hence acts in both the vertical and horizontal planes, the image formed thereby of the uniformly illuminated opening 16 is a uniformly illuminated rectangular light spot 17 (Fig. 4).

Thus, a uniformly illuminated rectangular area is provided in the plane of film N, which area is on the variable area sound track S when film N moves through this plane. For that reason, the uniformly illuminated area in the plane of film N, or light spot 17, is more or less obscured by the opaque portion of sound track S. Light spot 17, as obscured by the opaque portion of sound track S, may therefore be considered as being composed of a large number of very small horizontal levels of light which are equal in vertical extension, or height, but vary in horizontal extension, or length, in accordance with the variation in horizontal extension, or width, of the transparent portion of sound track S. The illumination of these horizontal levels is uniform, that is, the amount of light flux per unit area is equal in each individual level as well as in any one level as compared with any other level, the shorter levels thus containing a smaller amount of light flux than the longer ones.

Figure 1:
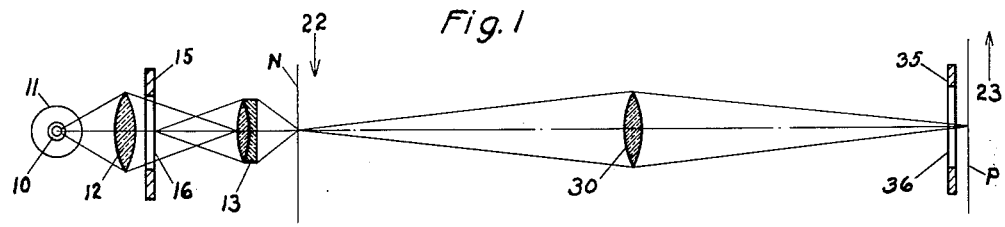
Fig. 1 is a diagrammatic longitudinal section in the vertical plane of a sound printing optical system embodying the present invention.
Figure 2:
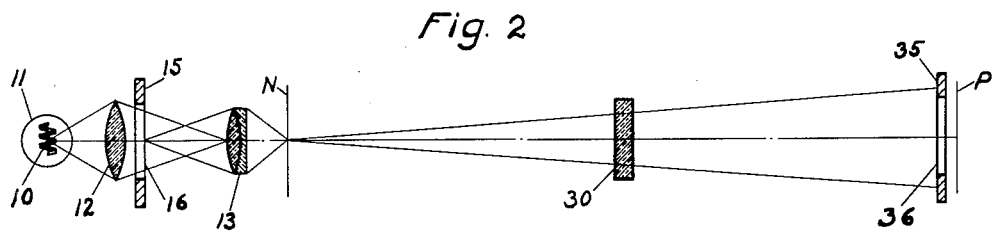
Fig. 2 is a corresponding section in the horizontal plane.
Figure 3:
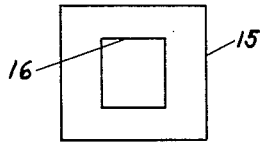
Fig. 3 is an elevation of an element shown in Figs. 1 and 2.

Between the plane of the negative film N and the plane of the positive film P, on which film the sound track S is to be printed, there is placed a cylindrical lens 30. Cylindrical lens 30 has its cylinder axis horizontal and hence acts in only the vertical plane, by which action it forms in the plane of film P an image of light spot 17. Since cylindrical lens 30 does not act in the horizontal plane, the light fluxes which emanate from the individual horizontal levels of light spot 17, diverge in the horizontal plane (Fig. 2). Since, on the other hand, cylindrical lens 30, by its action in the vertical plane, focuses these light fluxes in the plane of film P (Fig. 1), their divergence is restricted to a horizontal direction, and for each horizontal level of light spot 17 there is formed a corresponding horizontal level in the plane of film P. Since, furthermore, the angle of divergence is about equal for all the horizontal levels irrespective of their difference in length, the horizontally diverging light fluxes arrive at the plane of film P spread out over about equal lengths so that the horizontal levels in the plane of film P are of about equal length. Since, finally, the shorter horizontal levels of light spot 17 contain a smaller amount of light flux than the longer ones, the horizontal levels in the plane of film P corresponding to the shorter levels of light spot 17 have less illumination than those corresponding to the longer ones.

Thus, by virtue of the fact that light spot 17 is imaged in the plane of film P by a lens acting in only the vertical plane (cylindrical lens 30) and that, furthermore, there is no other lens provided in the optical system which acts in the horizontal plane and images light spot 17 in the plane of film P, there is formed in the plane of film P a light spot 31 whose illumination varies vertically (Fig. 5), and the amount of light flux contained in each horizontal level of light spot 31 is the same as was contained in the corresponding horizontal level of light spot 17. The variation in illumination of the horizontal levels of light spot 31, therefore, is directly and linearly proportional to the variation in length of the horizontal levels of light spot 17.

Figure 5:
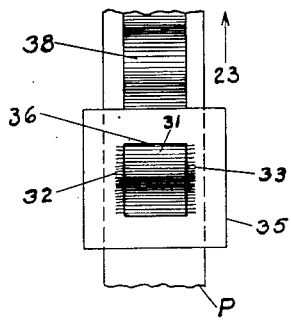
Fig. 5 is an enlarged elevation of a portion of the optical system of Figs. 1 and 2 showing the light spot of vertically varying illumination which is formed therein in the plane of the positive film.

It has been pointed out hereinbefore that the horizontally diverging light fluxes arrive at the plane of film P spread out over about equal lengths thus forming in the plane of film P horizontal levels of about equal length. Within each of these horizontal levels, however, the light flux is evenly distributed only over its central portion, while at its ends the amount of light flux per unit area decreases. The edges, therefore, of light spot 31 are blurred as indicated at 32 and 33 in Fig. 5, and hence would cause distortion if they were reproduced on film P. For that reason, a screen 35 with a rectangular opening 36, or like apertured masking means, is placed in front of the plane of film P, opening 36 being so dimensioned that the blurred edges 32 and 33 of light spot 31 are intercepted by screen 35 and only the central portion of light spot 31 is permitted to pass through opening 36 on to film P (Fig. 5). Thus, the reproduction of the blurred edges 32 and 33 on film P is prevented. Simultaneously, apertured screen 35 shields film P from being exposed to any stray light which might arise in the optical system, to which end it is customarily provided in projection sound printing optical systems.

It will thus be seen that with the conversion sound printing optical system of Figs. 1 to 5, the image formed in the plane of the positive film P, or light spot 31, corresponds to the illuminated area of the sound track on the negative film N, or light spot 17, only as regards the vertical variation of its illumination, which is distributed horizontally over the entire image in the plane of film P no matter over which fraction of the illuminated area of the sound track it is distributed horizontally. If, therefore, the sound track on the negative film N is of the variable area type as is sound track S shown by way of example in Fig. 4, there appears on the positive film P a sound track 38 (Fig. 5) which is of the variable density type but has otherwise the same characteristics as the variable area sound track S on film N. If, on the other hand, the sound track on film N is of the variable density type, there appears on film P also a sound track of the variable density type.

Due to the usual inversion produced when real images are formed by a simple positive lens, or lens system, such as cylindrical lens 30, the vertical directions of light spot 17 are inverted in light spot 31. For that reason, film N moves vertically in one direction while film P moves vertically in the reverse direction, as indicated, by way of example, by the arrows 22 and 23 (Fig. 1). Where such movement of the two films in opposite directions is undesirable, the advantages of the present invention may yet be enjoyed by employing the erect image conversion sound printing optical system disclosed and claimed in my copending application Serial No. 449,797, filed on the same day and assigned to the same assignee as this application, now Patent Number 2,366,040, issued December 26, 1944.

In the embodiment of the present invention shown in Figs. 1 to 5 and described hereinabove, cylindrical lens 30 is the only imaging means placed between the planes of films N and P. No harm, however, will result from placing other imaging means between these two planes provided that cylindrical lens 30, or its equivalent, is the only imaging means employed in the optical system which has the plane of film N, or light spot 17, and the plane of film P at its conjugate foci, and provided further that such other imaging means do not interfere with the action of cylindrical lens 30, or its equivalent, in the vertical plane. For example, in the embodiment of the invention shown in Figs. 6 and 7, which are identical with Figs. 1 and 2 in any other respect, a cylindrical lens 40 is placed between cylindrical lens 30 and the plane of film P. Since its cylinder axis is vertical, cylindrical lens 40 does not act in the vertical plane and hence does not interfere with the action of cylindrical lens 30 in that plane. But by its action in only the horizontal plane, cylindrical lens 40 forms substantially in the plane of film P an image of the aperture of cylindrical lens 30, which image coincides with light spot 31. Since the aperture of cylindrical lens 30 is uniformly illuminated, and since cylindrical lens 40 acts in the horizontal plane, the light flux is now evenly distributed over the entire length of each of the horizontal levels composing light spot 31 (Fig. 7) so that light spot 31 has no blurred edges in this case.

To obtain this result which at times may be desirable for reasons of light efficiency, cylindrical lens 40 may image substantially in the plane of film P not only the aperture of cylindrical lens 30 but any uniformly illuminated object in the optical system other than the uniformly illuminated area in the plane of film N, or light spot 17. For example, in the case illustrated in Figs. 6 and 7, cylindrical lens 40 may also form substantially in the plane of film P an image of the aperture of spherical lens 13. Furthermore, when the arrangement for uniformly illuminating an area in the plane of film N shown in Figs. 8 and 9 and described hereinbelow is employed with the optical system of Figs. 6 and 7, cylindrical lens 40 may image the aperture of condenser 12 substantially in the plane of film P. In the two last mentioned and in any similar cases, cylindrical lens 40 may be placed between cylindrical lens 30 and either the plane of film P, as shown in Figs. 6 and 7, or the plane of film N and, furthermore, cylindrical lenses 30 and 40 may advantageously be replaced by a single lens with two cylindrical surfaces. The first of these two surfaces has its cylinder axis horizontal and light spot 17 and the plane of film P at its conjugate foci, and the second surface has its cylinder axis vertical and a uniformly illuminated object other than light spot 17 and the plane of film P substantially at its conjugate foci.

The arrangement shown in Figs. 1 and 2, and Figs. 6 and 7, and consisting of lamp filament 10, condenser 12, screen 15 with opening 16, and spherical lens 13, is a conventional way of providing, in sound printing optical systems, means for uniformly illuminating an area in the plane of the negative film, and it has been shown and described as part of the optical systems according to the present invention by way of example only. There are a number of other ways of providing for a uniformly illuminated area in the plane of the negative film, which are equally well suited for the optical systems of the invention. One such way, for example, consists in omitting screen 15 with opening 16 and lens 13 and forming the image of lamp filament 10 by means of the spherical condenser 12 substantially at cylindrical lens 30. The resulting arrangement is shown, by way of example, in Figs. 8 and 9 for the optical system of Figs. 1 and 2, and by virtue thereof an area in the plane of film N is so illuminated that its central portion is again a uniformly illuminated light spot such as light spot 17 illustrated in Fig. 4. Since this uniformly illuminated area, or light spot, is on the variable area sound track S when film N moves through its plane, it is again more or less obscured by the opaque portion of sound track S.

Lamp filament 10 has been described in the preceding paragraph as being imaged by condenser 12 substantially at cylindrical lens 30, that is, either on cylindrical lens 30 as shown in Figs. 8 and 9 or in the general neighborhood thereof. However, condenser 12 may form the image of lamp filament 10 also in the neighborhood of, but not in, the plane of film P, be it in front of or beyond this plane. The imagery of lamp filament 10 at any one of the above named positions results in the uniform illumination of an area in the plane of film N, that is, in the formation of a uniformly illuminated light spot in that plane.

On account of the omission of screen 15 with opening 16 or, more specifically, of the image of opening 16 formed by spherical lens 13, the uniformly illuminated light spot in the plane of film N may in the case illustrated in Figs. 8 and 9 and explained in the two preceding paragraphs not always be restricted vertically and horizontally to the degree required for obtaining an image in the plane of film P which has suitable vertical and horizontal dimensions. This situation, which is immaterial as far as the particular imagery disclosed in the present specification is concerned, may be remedied in a number of ways as will easily be understood by those skilled in the art. For example, screen 15 with opening 16 may again restrict the two co-ordinate dimensions of light spot 17 by being placed adjacent to the plane of film N. Alternatively, screen 15 may, as shown by way of example in Figs. 8 and 9, be placed in front of the plane of film P so as to restrict light spot 31 to suitable dimensions. In the latter case, screen 15 performs also the functions of apertured screen 35 which therefore becomes superfluous and hence may be omitted in this case (see Figs. 8 and 9).

The arrangement for uniformly illuminating an area in the plane of film N shown in Figs. 8 and 9 as being employed with the optical system of Figs. 1 and 2 may equally well be employed with the optical system of Figs. 6 and 7, and the explanations made hereinabove in connection with Figs. 8 and 9 are valid also in this case.

As has been explained hereinabove, there exists considerable freedom for the choice of the conjugate foci of spherical condenser 12 when employed as shown in Figs. 8 and 9. A similar freedom exists when spherical condenser 12 is employed as shown in Figs. 1 and 2, and Figs. 6 and 7. In this case, condenser 12 performs its function uniformly to illuminate opening 16 when it forms the image of lamp filament 10 substantially at spherical lens 13, that is, either on that lens as shown in the drawings, or in the general neighborhood thereof. Similarly, when cylindrical lens 30 is employed as shown by way of example in Figs. 6 and 7, it performs its function evenly to distribute horizontally the light flux in light spot 31 when it forms the image of a uniformly illuminated object other than light spot 17 substantially in the plane of film P, that is, either in that plane as shown in Fig. 7, or in the general neighborhood thereof. On the other hand, the imaging means acting in only the vertical plane and performing the imagery between the plane of film N and the plane of film P must have at its conjugate foci the particular object and place of imagery associated therewith. That is to say, cylindrical lens 30 must have at its conjugate foci the uniformly illuminated area, or light spot, in the plane of film N and the plane of film P, respectively. Finally, when spherical lens 13 is employed, it should preferably have at its conjugate foci opening 16 and the plane of film N, respectively.

In the optical systems shown in Figs. 1 and 2 and 6 to 9 and described hereinabove as examples of the present invention, cylindrical lens 30 is placed halfway between the planes of films N and P. The sound track on the negative film N is therefore reproduced on the positive film P with a ratio of imagery of one to one in the vertical plane, that is, the variable density sound track produced on film P has the same vertical extension, or height, as the variable area or variable density sound track on film N. However, the objects of the invention, and particularly the conversion of a variable area sound track into a variable density sound track by printing, are also accomplished when cylindrical lens 30 is placed so that the sound track produced on film P is of either reduced or enlarged height.

No corresponding ratios of imagery exist in the horizontal plane since in this plane film N and film P are out of focus with respect to each other in any embodiment of the invention. The horizontal extension, or width, of the variable density sound track produced on film P depends therefore upon the size of the angle at which the light flux diverges in the horizontal plane from the plane of film N (see Figs. 2, 7, and 9). This angle is determined by the design given in any actual embodiment of the invention to the particular arrangement employed therewith for uniformly illuminating an area in the plane of film N, as will readily be understood by those skilled in the art, and the larger the angle is made, the wider a sound track is obtained on film P, and vice versa. In this condition there resides an additional advantage of the sound printing optical systems according to the present invention because they inherently afford simple, convenient, and efficient means by which very wide variable density sound tracks may be printed from either variable density or variable area sound tracks of standard or substandard width. Such very wide variable density sound tracks may be useful for various reasons, for example, because they can easily be divided, by being cut up vertically, into a number of narrow identical sound tracks.

The determination of the width of the variable density sound track produced on film P by the size of the angle of divergence at the plane of film N, and the determination of its height by the position of cylindrical lens 30 are entirely independent of each other. The variable density sound track on film P may therefore have the same height and width as the sound track on film N, or it may have the same height and either a reduced or an enlarged width, or it may have the same width and either a reduced or an enlarged height, or both its height and width may be either reduced or enlarged, or its height may be reduced and its width enlarged or vice versa. In all the cases in which the ratio of magnification is different heightwise and widthwise, no cylindrical or other anamorphoser need be provided in the optical systems of the invention since the divergence in their horizontal planes amounts to complete anamorphosis in these planes. This is a further advantage over the conventional sound printing optical systems in which anamorphosers must be provided if they are to operate efficiently with different ratios of magnification in the two co-ordinate directions.

The conversion, by means of the optical systems of the invention, of a variable area sound track into a variable density sound track has been explained hereinabove with reference to the variable area sound track S which is shown in Fig. 4 as being of the unilateral type. However, by means of these optical systems there may also be converted into a variable density sound track a variable area sound track of the bilateral, or symmetrical, type. An original negative of a symmetrical variable area sound track ordinarily has its transparent portion divided in two by its centrally disposed opaque portion. Thus, the uniformly illuminated light spot which is more or less obscured by the opaque portion of the variable area sound track, is composed in this case of horizontal levels of light consisting each of two illuminated sections which are separated by a dark section. But the symmetrical variable area sound track will nevertheless be converted into a single variable density sound track since, as has been explained hereinabove in connection with Figs. 1 and 2, the angle of divergence is about equal for all points of an individual horizontal level as well as for all horizontal levels, their difference in length notwithstanding. For the same reason, there may also be converted into a single variable density sound track by means of the optical systems of the invention a multiple variable area sound track, that is, a variable area sound track which is composed of a plurality of either unilateral or bilateral tracks.

The two arrangements shown in Figs. 1 and 2 and 6 and 7, and in Figs. 8 and 9, respectively, form in the plane of film N an area, or light spot, whose illumination is uniform in the two co-ordinate directions. That is to say, the light flux contained in this light spot is distributed over its whole area uniformly in the vertical as well as in the horizontal direction. Such uniform distribution of the light flux, however, is merely a matter of convenience in designing an optical system embodying the present invention, and not a prerequisite for operating it successfully. To that end, the light spot formed in the plane of film N need have a uniform distribution of light flux in only the horizontal direction. Whenever, therefore, it is desired to effect, in this light spot, a distribution of light flux which is non-uniform in the vertical direction, for example, by placing a screen of vertically varying transparency adjacent to the plane of film N, this may be done in any embodiment of the invention without impairing its operativeness. It will furthermore be understood that the terms "uniformly illuminated area," "uniformly illuminated light spot," "means for uniformly illuminating an area," and similar terms, as used throughout this description and in the appended claims, refer to an illuminated area, or light spot, whose illumination is uniform in at least the horizontal direction.

What is claimed is:

1. In an optical system for printing on a positive film from a negative film having a sound track thereon, the combination of a first plane through which said negative film may move vertically in one direction; a second plane through which said positive film may move vertically in the reverse direction; means for uniformly illuminating an area in said first plane, said area being on said sound track when said negative film moves through said first plane; first imaging means acting in only the vertical plane and forming in said second plane an image of said illuminated area, said first imaging means having an aperture; and second imaging means acting in only the horizontal plane and forming substantially in said second plane an image of said aperture of said first imaging means; said first imaging means being the only imaging means having at its conjugate foci said illuminated area and said second plane, and said first mentioned image and said second mentioned image coinciding in said second plane.

2. In an optical system for printing on a positive film from a negative film having a sound track thereon, the combination of a first plane through which said negative film may move vertically in one direction; a second plane through which said positive film may move vertically in the reverse direction; means for uniformly illuminating an area in said first plane, said area being on said sound track when said negative film moves through said first plane; imaging means acting in only the vertical plane and forming in said second plane an image of said illuminated area, said imaging means having an aperture; and a cylindrical lens having its cylinder axis vertical and forming substantially in said second plane an image of said aperture of said imaging means; said imaging means being the only imaging means having at its conjugate foci said illuminated area and said second plane, and said first mentioned image and said second mentioned image coinciding in said second plane.

3. In an optical system for printing on a positive film from a negative film having a sound track thereon, the combination of a first plane through which said negative film may move vertically in one direction; a second plane through which said positive film may move vertically in the reverse direction; means for uniformly illuminating an area in said first plane, said area being on said sound track when said negative film moves through said first plane; a first cylindrical lens having its cylinder axis horizontal and forming in said second plane an image of said illuminated area, said first cylindrical lens having an aperture; and a second cylindrical lens having its cylinder axis vertical and forming substantially in said second plane an image of said aperture of said first cylindrical lens; said first cylindrical lens being the only imaging means having at its conjugate foci said illuminated area and said second plane, and said first mentioned image and said second mentioned image coinciding in said second plane.

JOHN A. MAURER, Jr.